US005326617A

United States Patent [19]

Wright et al.

[11] Patent Number: 5,326,617

[45] Date of Patent: Jul. 5, 1994

[54] CURL PREVENTION USING A TRANSVERSE SLIT ON TRAY-LOADED FILM FOR PRINTERS

[75] Inventors: Craig A. Wright, San Diego, Calif.; John A. Underwood, Dublin, Ireland

[73] Assignee: Hewlett-Packard Company, Palo Alto, Calif.

[21] Appl. No.: 969,546

[22] Filed: Oct. 30, 1992

Related U.S. Application Data

[63] Continuation of Ser. No. 601,545, Oct. 22, 1990, abandoned.

[51] Int. Cl.[5] .......................... B41M 5/00; B32B 3/00

[52] U.S. Cl. ...................................... 428/136; 428/40; 428/41; 428/43; 428/192; 428/194; 428/195; 428/203; 428/913; 428/138; 428/211; 428/202; 428/220; 428/201; 428/132; 428/137; 346/135.1

[58] Field of Search ..................... 428/40, 41, 43, 192, 428/194, 195, 203, 913, 138, 136, 211, 202, 220, 201, 132, 137; 346/135.1

[56] References Cited

U.S. PATENT DOCUMENTS

| | | | |
|---|---|---|---|
| 1,433,077 | 10/1922 | Hansen | 428/136 |
| 3,618,752 | 11/1971 | Barker et al. | 206/455 |
| 4,051,285 | 9/1977 | Kramer | 428/43 |
| 4,592,954 | 6/1986 | Malhotra | 428/195 X |
| 4,627,994 | 12/1986 | Welsch | 428/138 X |
| 4,696,843 | 9/1987 | Schmidt | 428/138 X |
| 4,814,216 | 3/1989 | Brunett et al. | 428/43 |
| 4,865,669 | 9/1989 | Schmidt | 428/138 X |
| 4,873,135 | 10/1989 | Wihnebel et al. | 428/46 X |
| 4,946,728 | 8/1990 | Ikeda et al. | 428/40 |
| 4,980,212 | 12/1990 | Marquis et al. | 428/43 X |
| 5,200,242 | 4/1993 | Hohmann | 428/40 |

*Primary Examiner*—William Watkins, III
*Attorney, Agent, or Firm*—David S. Romney

[57] ABSTRACT

In order to avoid misfeeds from tray-loaded film, a lateral slit is provided through a backing sheet of composite media in a middle portion of a leader region where the film is adhered on both sides of the lateral slit to the backing sheet, thereby allowing the backing sheet to expand or contract at a different rate than the adjacent film.

4 Claims, 4 Drawing Sheets

CURL PREVENTION USING A TRANSVERSE SLIT ON TRAY-LOADED FILM FOR PRINTERS

This is a continuation of copending application Ser. No. 07/601,545 filed on Oct. 22, 1990 now abandoned.

This invention relates generally to printing on composite media, and more specifically to cutsheet film with a backing sheet which is used on automatically loaded printers.

It is very typical for the same cutsheet media to be used in both hand-loaded printers and automatically loaded printers. This avoids keeping two separate inventories of media. However, it was found that certain types of composite film media designed for use in hand-loaded printers sometimes were not satisfactory for automatic stack-loading printers.

More specifically, a composite media of film plus backing sheet of the "Lead-Edge" design was developed to be suitable for use with a conventional hand-loaded printer. Such hand-loaded printers typically allow a user to feed each individual sheet into the printer in a manner similar to feeding a sheet of paper into a conventional typewriter. However, problems developed when a stack of the same composite cutsheet media was used in an improved printer which provided automatic stack loading in lieu of hand-loading. In some environments having diverse combinations of temperature and relative humidity conditions, the leading edge of the composite media in the stack would curl, thereby interfering with the automatic loading and causing misfeeds.

It therefore became necessary to develop a different type of lead edge composite media suitable for automatic printer loading, which would also continue to be suitable for hand feeding into a printer.

OBJECTS AND BRIEF SUMMARY OF THE INVENTION

It is an object of the present invention to modify existing composite printing media such as the type formed by a laminate of film and backing in order to facilitate the automatic loading of printers by preventing misfeeds. A related object is to provide a composite printing media which can be satisfactorily fed into a hand-loaded printer as well as into an automatically loaded printer.

The invention provides a lateral slit through the backing sheet of a composite media in a middle portion of the leader region where the film is adhered on both sides of the lateral slit to the backing sheet. This allows the backing sheet to expand or contract at a different rate as compared to the adjacent film without causing excessive curling, thereby preventing printing misfeeds in extreme environmental conditions. In a preferred embodiment of the invention, the slit is displaced from the terminal edge of the finished film and also displaced from the leading edge of the film leader so as to be intermediate therebetween. By keeping the slit narrow, and by having the leading edge of the backing approximately flush with the leading edge of the film, and by providing adhesive on both sides of the slit and extending the adhesive continuously between the slit and the leading edge, the composite acts like a unitary laminant when picked up from the stack by a loading mechanism while at the same time providing an expansion/contraction joint along the full lateral width of the leader portion of the backing paper.

DETAILED DESCRIPTION OF THE PREFERRED EMBODIMENT

Figure 1:
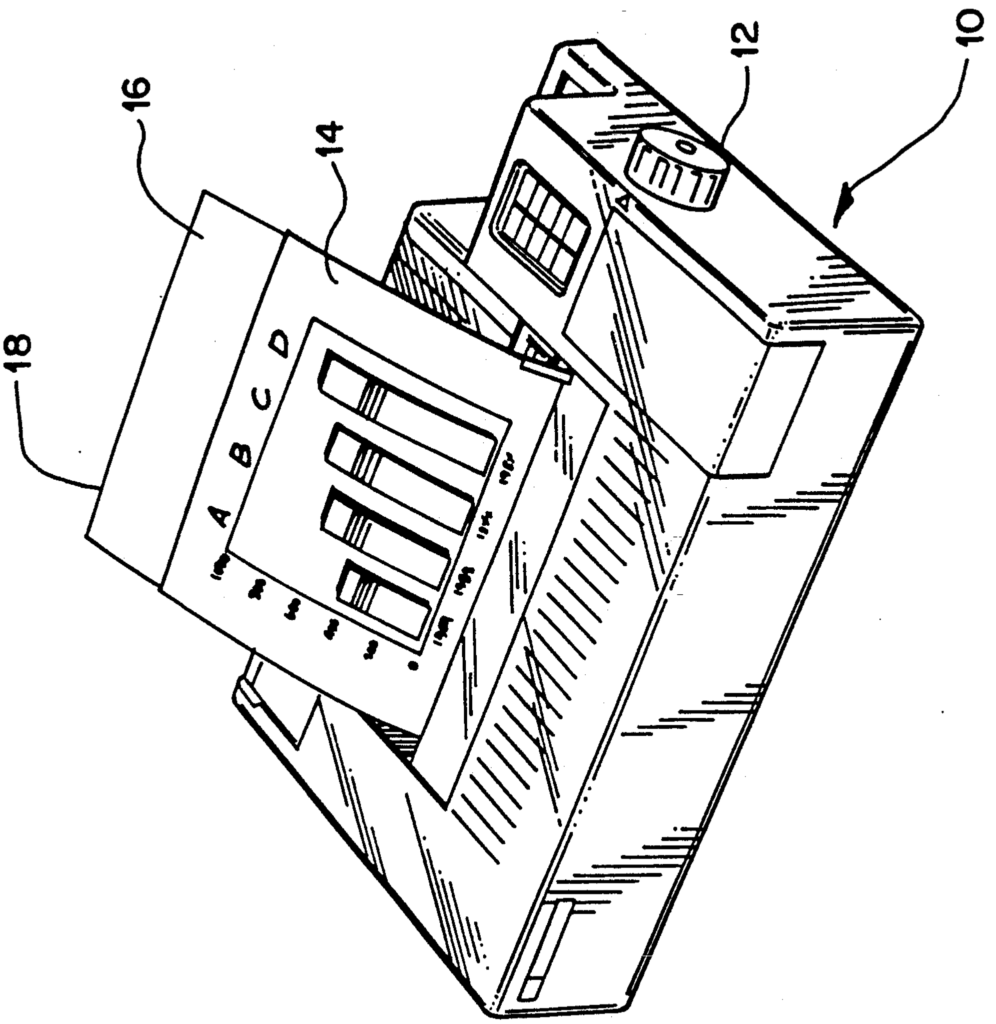
FIG. 1 shows a typical hand-loaded ink-jet printer which uses composite media of the type having a leader for insertion into a feeding mechanism.

As shown in FIG. 1, a typical hand-loaded ink-jet printer 10 includes a manual roller knob 12 for initially feeding a sheet of transparent film 14 into the printer. In order to maximize the printing area at the top of a film sheet, a leader 16 is provided which preferably has a sealed leading edge 18 where the film sheet and underlying backing sheet are joined together to facilitate proper feeding into the printer.

Figure 2:
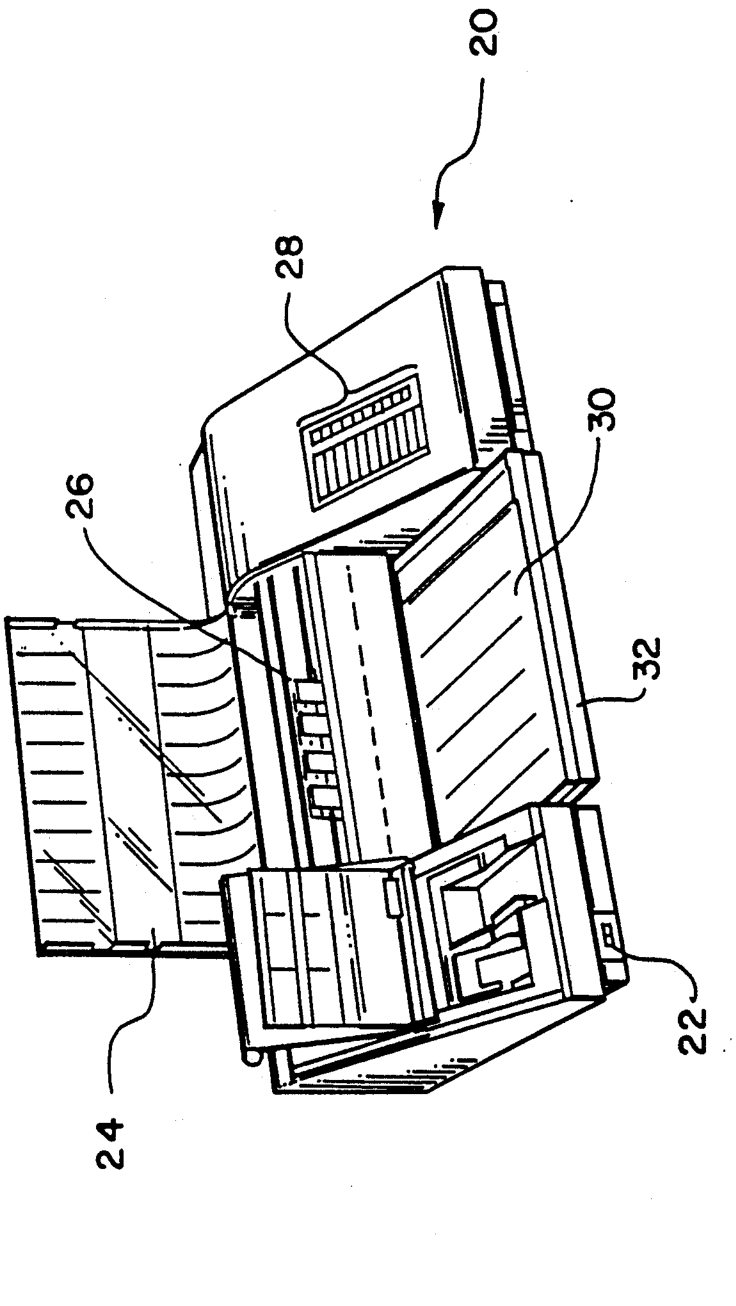
FIG. 2 shows a typical ink-jet printer capable of automatic loading of composite media from a stack tray.

In FIG. 2 a different printer 20 is shown which allows for either manual feeding or automatic feeding of cutsheet film into the printer. Such an ink-jet printer typically includes a power switch 22, a flip-up protective window 24, an ink cartridge carrier 26, and an operator control panel 28. Sheets can be manually fed into the printer, or alternatively a tray cover 30 is removed so that a stack of sheets such as composite film transparencies can be automatically fed from a media tray 32 into the printer.

Figure 3:
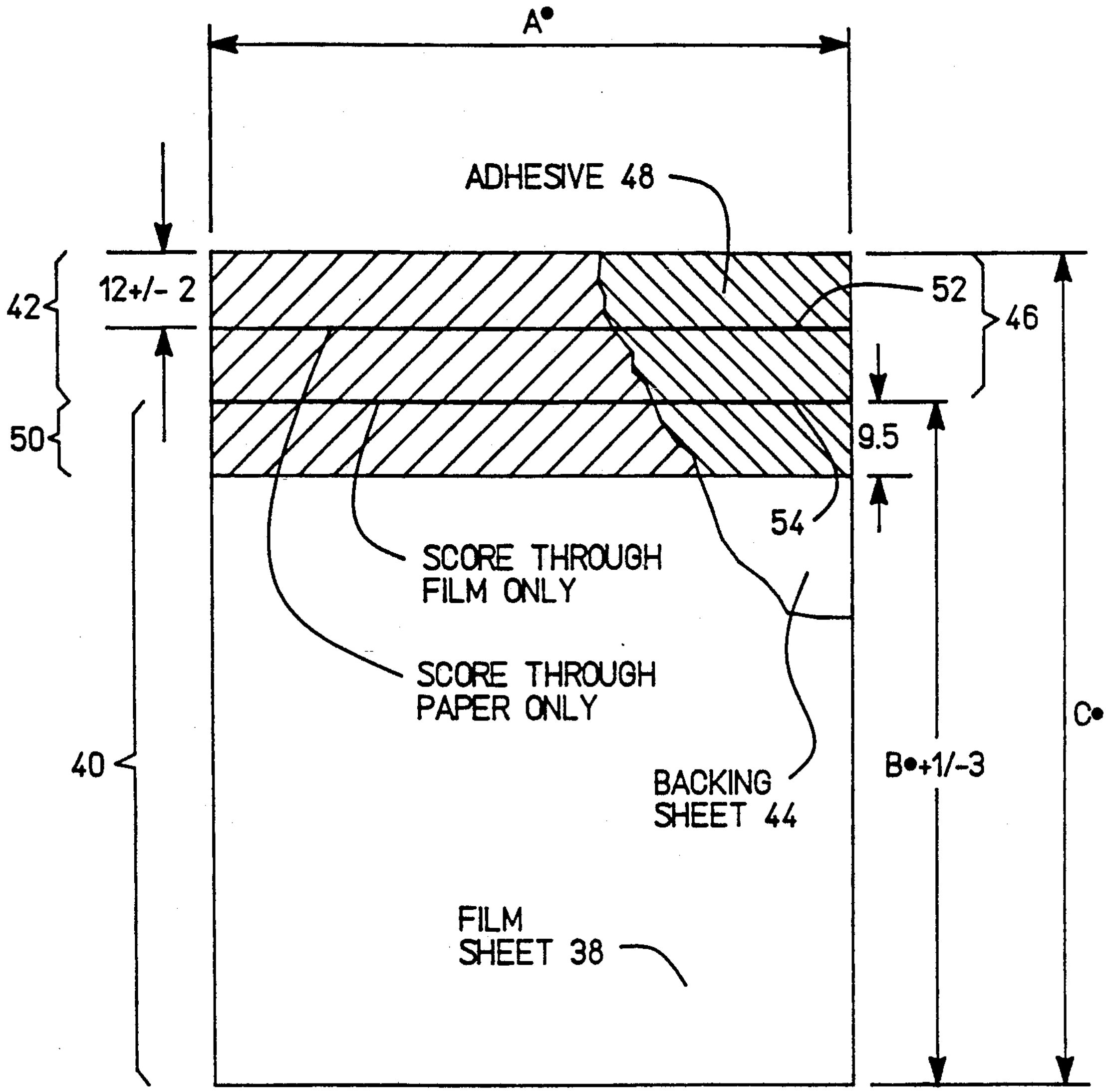
FIG. 3 shows the specification sheet for a preferred embodiment of composite media incorporating the expansion/contraction features of the present invention.

The specifications for a preferred form of the invention are set forth in FIG. 3. More specifically, an elongated film sheet 38 is scored along a lateral line 54 to provide a finished film portion 40 of a predetermined length. A backing sheet 44 preferably extends along the entire film sheet 38, and includes a leader backing portion 46. A layer of suitable adhesive 48 connects the leader backing portion 46 to the overlying leader film 42 and also provides an adhesive layer removably connecting a forward strip of film 50 with its adjacent underlying backing. Thus at the end of the printing operation, the finished film portion 40 can be manually removed from the leader film 42 and backing sheet 44 by separating the forward strip of film 50 from its adhesive connection to the backing sheet.

In order to prevent undesirable curling of the leader prior to the cutsheet transparency being automatically fed into the printer, a paper slit 52 is provided across the entire width of the leader backing portion 46 in an intermediate location displaced between the leading edge and the film scoring 54. In the preferred embodiment, such a paper slit is preferably narrow so as to be 1.6 mm or less. To assure proper lamination between the two layers, no creases or wrinkles in the backing sheet are allowed. For typical printing conditions, an image coating is applied only to the externally exposes face of the film, while the uncoated surface is against the backing sheet directly or adhered to the backing sheet through a layer of suitable adhesive. The edges of the film and backing paper are preferably cut to be flush within 0.8 mm, particularly where the leading film edge 58 and the leading backing edge 60 are sealed together at the forward boundary of the cutsheet. As best shown in FIG. 3, the various primary dimensions A, B and C of the currently preferred embodiment of the media sheet are set forth in the following table:

| SIZE | A (mm) | B (mm) | C (mm) |
|---|---|---|---|
| A (ENGLISH) | 213.4 | 279.4 | 304.8 |
| A4 (METRIC) | 210 | 297 | 322.4 |

In the preferred version of FIG. 3, the B dimension can tolerate variations of +1 mm/−3 mm from the table; the backing sheet portion 56 above the slit 52 is 12 mm wide with tolerable variations of +2 mm/−2 mm; and the adhesive strip underlying the forward strip of film 50 is 9.5 mm wide.

Of course, other laminating materials other than transparent film and paper backing may be used to implement the advantages of the invention in a composite laminant, all depending on the media required and the type of printer being used.

Figure 4:
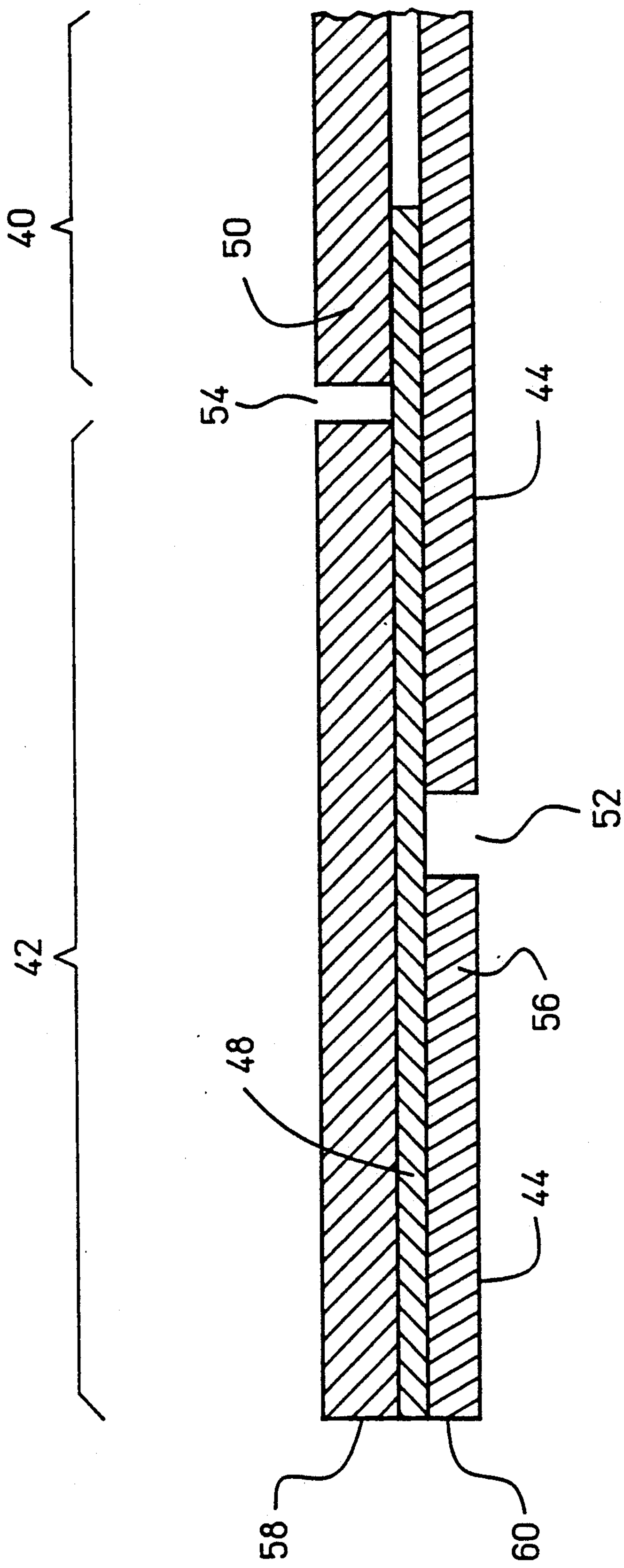
FIG. 4 shows a enlarged schematic cross-sectional enlargement of the composite media of FIG. 3, in order to illustrate the relative positioning of the film and backing in the vicinity of the leader portion of the composite media cutsheet.

The actual dimensional thickness of the film, adhesive and backing are exaggerated in the schematic illustration of FIG. 4 in order to show the relative positioning of the slit 52 (which goes completely through the paper backing but not through the film) and the scoring 54 (which goes completely through the transparent film but not through the backing). The continuous layer of adhesive 48 is also shown to provide the adequate connection for creating a laminant which has no loose ends or edges which might otherwise cause a misfeed.

It will be appreciated by those skilled in the art that the improvement provided by the invention solves the problem of curling for automatic feeding into a stack-loaded printer while at the same time allowing the same composite media to still be used satisfactorily in the hand-loaded printers. While the invention is specifically suited and designed for ink-jet printers, it is also applicable to other printers which use composite media which is automatically loaded, as by a stack tray.

While a preferred exemplary embodiment of the invention has been shown and described, it is to be understood that various changes and modifications can be made without departing from the spirit and scope of the invention as defined by the following claims.

We claim as our invention:

1. A sheet of media suitable both for manual feeding as well as automatic tray-loaded feeding into inkjet printers comprising:

an elongated film sheet having a finished film portion having a length and a leader portion, said leader portion being separatable from said finished film portion after a printing operation is completed;

a backing sheet having a thickness and width underlying said elongated film sheet for providing the sole connection for holding together said finished film portion and said leader portion during the feeding of said film sheet as well as during the printing operation, said backing sheet underlying the entire leader portion and joined together therewith along a first junction by an adhesive layer completely covering said junction, said backing sheet also underlying a forwardmost lateral strip of said finished film portion and jointed together therewith along a second junction by an adhesive layer completely covering said junction, said backing sheet being separatable from said finished film portion after a printing operation is completed;

a lateral slit in said backing sheet in an intermediate location in said first junction, said lateral slit extending completely through said thickness of said backing of said lacking sheet and continuously across the entire width of said backing sheet to provide an expansion and contraction joint during any time period when multiple sheets of media are stacked in a tray-loaded printer, and wherein a composite laminant is formed by said backing sheet, said adhesive layer along said first and second junctions, said film leader, and said forwardmost lateral strip of said finished film portion in order to facilitate the manual feeding and the tray-loaded feeding media into the printer.

2. The media sheet of claim 1 wherein said elongated film includes a film leader having a leading film edge which is substantially flush with a leading backing edge of said backing sheet.

3. The media sheet of claim 2 wherein said leading film edge and said leading backing edge are sealed together.

4. The media sheet of claim 1 wherein said lateral slit is located to be substantially equidistant between forward and rearward boundaries of said first junction.

* * * * *